United States Patent [19]

Lynn

[11] 4,225,628
[45] Sep. 30, 1980

[54] CITRUS FIBER ADDITIVE PRODUCT AND PROCESS FOR MAKING SAME

[75] Inventor: Charles C. Lynn, Babson Park, Fla.

[73] Assignee: Ben Hill Griffin, Inc., Frostproof, Fla.

[21] Appl. No.: 34,642

[22] Filed: Apr. 30, 1979

Related U.S. Application Data

[63] Continuation-in-part of Ser. No. 866,840, Jan. 4, 1978, abandoned.

[51] Int. Cl.³ .................. A21D 2/36; A23L 1/313; A23L 1/32
[52] U.S. Cl. .................. 426/549; 426/613; 426/614; 426/646; 426/496; 426/472; 426/616
[58] Field of Search ........... 426/472, 616, 68, 69, 426/549, 496, 646, 613, 614, 568

[56] References Cited

U.S. PATENT DOCUMENTS

| | | | |
|---|---|---|---|
| Re. 22,865 | 4/1947 | Vincent | 426/616 |
| 2,147,521 | 2/1939 | Bustamante | 426/616 |
| 2,187,501 | 1/1940 | Lissauer | 426/616 |
| 2,471,363 | 5/1949 | Vincent | 426/616 |
| 2,548,510 | 4/1951 | Neal | 426/616 |

*Primary Examiner*—Jeanette M. Hunter
*Attorney, Agent, or Firm*—Arthur G. Yeager

[57] ABSTRACT

Preparing a citrus fiber additive for food products, made from about 80% orange and 20% grapefruit waste containing the peel, membrane, pulp and seed. After washing the fruit, removing the oil from the fruit, extracting the juice therefrom, chopping the waste into chunks, neutralizing the acid content of the chunks by the addition of calcium hydroxide, and pressing out and removing the wet molasses from the neutralized chunks, the process includes:

A. blending in sesame grain flour;
B. grinding such pressed chunks into about ¼ inch uniform particle size material;
C. drying to less than about 7% moisture in moderate heat of about 210° F.–230° F. into a light tan colored material; and
D. milling said material into a desired particle size.

17 Claims, No Drawings

CITRUS FIBER ADDITIVE PRODUCT AND PROCESS FOR MAKING SAME

RELATED APPLICATION

This is a continuation-in-part of my pending application Ser. No. 866,840 filed Jan. 4, 1978 now abandoned.

BACKGROUND OF THE INVENTION

1. Field of the Invention

This invention relates to citrus products and more particularly to a citrus fiber additive and process of making same, as an intermediate for addition to grain flour and other food applications to be consumed, after cooking, by humans.

2. Description of the Prior Art

There are many patents relating to the production of cattle feed from citrus by-products and for producing breakfast type foods and cereals. Prior patents which are illustrative of the prior art art U.S. Pat. Nos. 2,147,521—Bustamante; 2,215,944—Vincent; 2,548,510—Neal; 2,595,181—Vincent; 2,707,153—Bettman; 2,810,649—Bonnell; 3,112,202—Wadsworth; 3,239,359—Stansbary; 3,551,163—Vincent; and 3,966,984—Cocke.

Also, see "By-Products and Specialty Products of Florida Citrus", Bulletin 784 (technical), December, 1976 by J. W. Kesterson and R. J. Braddock, particularly pages 5–25 and 87–92 thereof. None of the known prior art, including that set forth hereinabove, discloses or teaches, either alone or any appropriate combination, the invention herein described and claimed.

SUMMARY OF THE INVENTION

Citrus fruits are generally washed by passing through a powered brush washer flooded with a soap and water solution. This process removes field dirt and debris as well as residues of insecticides or other sprays applied to the fruit while on the trees. The final rinse of the washing process is with potable water.

The cleaned fruit then passes through an oil extractor, such as a powdered scarifying roller bed that is flooded with water, wherein the entire surface of the whole fruit is pricked to release oil from the peel. The oil thereby released into the water is subsequently removed therefrom downstream by additional processing.

The fruit then passes to juice extractors wherein the fruit is halved and reamed. The peel is discharged into a screw conveyor while the balance of the fruit consisting of juice, seeds, pulp cells, and membrane flow through a sanitary trough to a finisher wherein the juice and some pulp cells are separated from the mass to be further processed in accord with well known techniques in the art. The seeds, membrane and most of the pulp are returned to the same screw conveyor carrying the peel.

Normally citrus waste contains from 80% to 85% moisture and while in this state it is shredded by chopping with a vertical hammermill which comminutes the waste through approximately 1¼ inch screen openings into particulated sized chunks ranging from about ¼ to ¾ inches. The addition of controlled amounts of approximately 0.2% to 0.5% lime (calcium hyroxide or calcium oxide) at about 0.33% by weight of the citrus waste establishes a pH of about 5.5–7.0. This liming process makes it possible to pass the neutralized chunks of citrus fruit waste through a mechanical continuous press to extract water and soluble solids therefrom and reduce the moisture in the remaining mass from such 80% to 85% to approximately 70%. This partially dried material is then introduced into a rotating dryer, having an exit temperature of more than about 300° F., in order to efficiently dehydrate the pressed mass to a final low moisture content of about 8% to 10%. The dried citrus material passes through a cooler drum with countercurrent air flow. In some installations three products may be obtained from such cooler drum, i.e., the dust or fines of about 1%, the meal of about 14% and large pulp of about 85%. The resulting product or products are used as a cattle feed or the like either in a loose bulk state or in a pelletized state.

In accord with this invention, after the water and soluble solids have been pressed from the waste, before introduction into a dryer, the chunks are further ground into a smaller uniform particle size of approximately ¼ inch. Preferably a high protein flour such as extracted sesame flour of about 50% protein content is blended with the uniform particle sized chunks before the mixture is dried in a convection dryer with high velocity air flow in a moderate heat, preferably about 220° F., until the moisture content is about 5%. Thereafter, the dried material is milled into flour consistency, i.e., so that 100% of the mass will pass through a 30 mesh seive, and in some embodiments will pass through a 100 mesh seive. It has been found that a mixture of about 80% orange citrus waste and 20% of grapefruit citrus waste results in a universally useable fiber additive for grain flour as will be more fully explained hereinafter.

A general object of this invention is to produce a citrus fiber product which is a semifinished material used as an additive for grain flour.

A particular object is the provision of a process to convert citrus waste products into nutritive fiber additive for foods.

A specific object is to produce a citrus fiber additive which enhances the nutritional value of cooked grain flour foods without detracting from the desirability of those foods.

A further object is the conversion of citrus waste into a citrus food product which is added to other foods for human consumption in lieu of its present use as cattle feed.

DETAILED DESCRIPTION OF THE PREFERRED EMBODIMENTS

The novel features which are believed to be characteristic of this invention are set forth with particularity in the appended claims. The invention itself, however, both as to its organization and method of operation, together with further objects and advantages thereof, may best be understood by reference to the following description.

As hereinabove described, the process of juicing citrus fruits and producing cattle feed from wastes, including peel, membranes, seeds and most of the pulp are well known. However, no citrus fiber additive has been developed from these waste products, which could readily be used in grain flour products, such as breads and cakes, except for dried orange and grapefruit sacs in accord with page 92 of the references "By-Products and Specialty Products of Florida of Citrus" set forth above. However, any food additive made from such sacs would be expensively prohibitive, except possibly in medicines or the like, as would be apparent to persons skilled in the art.

In the preferred embodiment of the invention, fresh citrus waste, resulting from normal juice extraction, i.e. the peel, most of the pulp, membranes and seeds, is promptly subjected to oil removal, chopping into communited chunks, neutralized in acidity thereof and pressed to minimize enzyme reactions and to remove about 15% of the water. The use of fresh citrus waste and the prompt processing of it is important in that it minimizes enzymatic reactions which produce undesirable flavors and/or color as is well known. The waste, constituting approximately 80% orange and 20% grapefruit, is then ground into ¼ inch uniform particle size and blended with a solvent extracted sesame flour, containing about 50% protein, in a ratio of one part sesame flour to fifty parts citrus waste, as by weight. The mixture is then dried in a convection dryer with high velocity air flow at preferably 210° F.–230° F. with a thickness layer of the material in the dryer being approximately 1". Less thickness decreases dryer efficiency while increased thickness tends to inhibit thorough drying of the material.

The lack of any elevated temperature previous to this drying step and the moderate temperature at which the mixture is to be dried is most important in that fast and efficient dehydration is a practical requirement, while providing for partial sterilization and enzyme deactivation to achieve stability to the final product are also important. Concurrently, the adverse effect on the valuable and heat sensitive substances is minimized, such as the denaturing of the proteins, destruction of vitamins, and caramelization of the sugars in the carbohydrate fraction of the mixture. These factors are not only important from a nutritional point of view but also are vital for obtaining a material with unique functional properties.

After drying the mixture to less than about 7% moisture, and preferably 3%–5% moisture, such mixture is milled into a desired particle size having a flour consistency which may be bagged and shipped to baking plants and the like food processors for use as a fiber additive, for adding to or replacing a portion of other ingredients such as sugar, eggs, flour, extending meat products, etc. The product of this invention is intended to be an intermediate or a semifinished material which is incorporated into other common human foods to result in a nutritionally improved human food product.

While it is contemplated that the citrus waste may consist of all orange, the addition of grapefruit enhances the final product by providing increased pectin fiber, desirable color, and modifying the functional properties i.e., without grapefruit the final product would be, for example, browner in color and more readily detectable in white flour baked products, and the functional properties would be somewhat different. Different varieties of citrus fruits exhibit considerably different analytical compositions, and thus provide different functional properties to the citrus fiber additive product of this invention. Therefore, it is necessary to continually monitor the product and change the proportions of orange, grapefruit, and sesame flour as needed in order to produce a product with the desired functional properties.

During dehydration to remove the moisture from the citrus residue, the volatile components, includings oils, d'limonene and water vapor, may be captured and subjected to further processing in a manner known in the art. The forced air dryers preferably should be drying the waste at 220° F., but may be low as 190° F. and possibly as high as 310° F. during the initial stages of drying, i.e., the wastes may start at 310° F., but as it is dried, the temperature should drop to prevent any adverse effect thereon. The mean temperature of the drying step should be no more than about 280° F. to inhibit any serious problem with the resulting citrus fiber additive contemplated herein.

As examples of the processing of citrus wastes in accord with this invention, 100 pounds of orange wastes were comminuted into ¼ inch particle size, dried at 250° F. for 6.3 minutes to 4% moisture content, and milled into flour consistency of 100% through a 30 mesh seive. Another example, is the same as above except the temperature was at 220° F. for 8.6 minutes. A further example using similar fruit, etc., is a starting temperature of 300° F. gradually reducing to 230° F. for 6 minutes (mean temperature of about 260° F.).

The natural fruit fiber additive in accord with this invention, utilizing 80% orange and 20% grapefruit waste and with extracted sesame flour, having about 50% protein content, blended, as hereinabove described, in an amount equal to about 1/50 as by weight to the pressed-out and neutralized chunks of citrus waste, has the following proximate characteristics:

| TYPICAL PROXIMATE ANALYSIS: | | TYPICAL MICROBIOLOGICAL PROFILE: | |
| --- | --- | --- | --- |
| | Percent | Standard Plate Count | <10,000/g |
| | | Samonella | neg. |
| Protein | 10.5 | E. Coli | <3/g |
| Moisture | 6.0 | Coliform | <3/g |
| Ash | 7.0 | Staphylococci | <10/g |
| Fat | 2.5 | | |
| Crude Fiber | 12.5 | TYPICAL ELEMENTAL ANALYSIS: | |
| Carbohydrates | 61.5 | | |
| Total | 100.00 | | |
| | | | mg Per 100 Grams |
| Neutral Detergent Fiber | 21.0 | Phosophorus | 230 |
| | | Potassium | 1,200 |
| Acid Detergent Fiber | 27.0 | Calcium | 1,900 |
| Pectin | 4.0 | Magnesium | 140 |
| Sulphur | 0.095 | Sodium | 35 |
| | | Iron | 9 |
| pH (10–1 diluted) | 6.4 | | |
| Calories per Gram | 3.1 | | Parts per Million |
| TYPICAL AMINO ACID PROFILE: | | Aluminum | 39.0 |
| | | Barium | 4.8 |
| Grams/100 Grams Protein | | Boron | 23.0 |
| | | Chromium | 3.4 |
| Lysine | 3.36 | Copper | 9.0 |

-continued

| | | | |
|---|---|---|---|
| Threonine | 2.69 | Manganese | 7.5 |
| Valine | 3.68 | Strontium | 53.5 |
| Cystine | 0.10 | Zinc | 18.5 |
| Methionine | 0.85 | | |
| Leucine | 5.46 | Cobalt | <0.05 ppm |
| Isoleucine | 2.90 | | |
| Tyrosine | 2.30 | PHYSICAL APPEARANCE: | |
| Phenylalanine | 3.64 | | |
| Tryptophan | 1.12 | Light tannish color; slight citrus odor | |
| Histidine | 1.71 | | |
| Ammonia | 1.50 | | |
| Arginine | 7.18 | TYPICAL SIEVE ANALYSIS: | |
| Aspartic | 8.57 | | |
| Serine | 4.08 | | |
| Glutamic | 12.00 | Normal Grinding | Mesh |
| Proline | 6.46 | 100% thru | 30 |
| Glycine | 4.29 | 98% thru | 40 |
| Alanine | 4.30 | 75% thru | 60 |
| | | 50% thru | 80 |
| TYPICAL VITAMIN ANALYSIS: | | 40% thru | 100 |
| Per 100 Grams | | Fine Grinding | |
| Vitamin B$_2$ | 0.3 mg | 100% thru | 60 |
| Vitamin C | 4.5 mg | 99% thru | 100 |
| Vitamin E | 12.5 I.U. | | |
| Vitamin A | 170.0 I.U. | | |

The citrus fiber additive product for use with grain flour for human consumption produced in accordance with the preferred embodiment has many outstanding characteristics among which are:

A. Non-hygroscopic, i.e., the product will not absorb moisture from the air.

B. Crude fiber content approximately 25% higher than in bran.

C. Dietary fiber (neutral detergent determination) is about 20% of the product.

D. Protein content is somewhat higher than in cake flour and only slightly lower than in bread flour.

E. Contains natural pectin which is of value in its water binding ability and for good health, particularly digestion as well as lowering blood cholestrol.

F. Lower in calories than wheat flour.

G. High moisture absorption, approximately 300%-500%.

H. Good dispersion characteristics without lumping, either hot or cold.

I. Even though high moisture absorber and retainer, the product does not produce a moist or soggy mouth-feel which normally is associated with high moisture absorbing materials.

J. Fiber is mellow or soft on the digestive tract, like bran, whereas cellulose is harsh.

K. Most importantly, in breads and in cakes, there is no loss of volume, and essentially no change in grain, cell wall, or texture of the bread or cake. Even in white bread in which 2-5% of the product is added, there is little detection of a color difference. Bran fiber addition causes noticeable specks in white or wheat bread, supresses volume, and causes changes in cell structure and texture.

L. No requirement to add gluten as with most other fiber additives to counteract the adverse effects as described above.

M. With 25% whole wheat flour, 70% white flour and 5% of the additive, the resulting bread would have the volume and mouthfeel similar to white bread and resemble the texture thereof, while the total fiber content would be about the same as total whole wheat bread.

N. No other known fiber additive will properly function as a cake flour additive.

O. Since more moisture is absorbed the resulting bread will weigh more.

P. Act as complexing agent, thus slowing down starch degradation which causes staling, reducing mold formation and extending shelf life; therefore may be able to eliminate other chemical preservatives.

Q. Need not alter present formulations of baked bread goods except for each percent of the instant additive product used, the amount of water should be increased by an extra percent; i.e., if 100 ounces of water were used with 100 ounces of flour and 5 ounces of additive replaced 5 ounces of flour, 105 ounces of water should be used. For cakes, the amount of water to be added may vary slightly from that for bread, as illustrated below:

EXAMPLE 1

YELLOW LAYER CAKES

| | Control | Test |
|---|---|---|
| Cake Flour | 300 Grams | 291 Grams |
| Citrus Fiber Additive | — | 9 Grams |
| Water | 180 cc | 186 cc |
| Granulated Sugar | 345 Grams | 345 Grams |
| Shortening | 120 Grams | 120 Grams |
| Whole Eggs | 180 Grams | 180 Grams |
| Salt | 6 Grams | 6 Grams |
| Baking Powder | 15 Grams | 15 Grams |
| Nonfat Dry Milk | 24 Grams | 24 Grams |

EXAMPLE II

CHOCOLATE LAYER CAKES

| | Control | Test |
|---|---|---|
| Consumer-type Cake Mix | 530 Grams | 530 Grams |
| Citrus Fiber Additive | — | 10 Grams |
| Water | 340 cc | 355 cc |
| Whole Eggs | 100 Grams | 100 Grams |

EXAMPLE III

SWEDISH RYE BREADS

| | Control | Test |
|---|---|---|
| All Purpose Flour | 500 Grams | 500 Grams |
| Medium Rye Flour | 242 Grams | 270 Grams |
| Citrus Fiber Additive | — | 32 Grams |
| Water | 450 cc | 480 cc |
| Molasses | 48 Grams | 48 Grams |
| Margarine | 30 Grams | 30 Grams |
| Dough Conditioner | 10 Grams | 10 Grams |
| Salt | 16 Grams | 16 Grams |
| Sugar | 48 Grams | 48 Grams |
| Dry Yeast | 14 Grams | 14 Grams |
| Yeast Nutrient | 1 cc | 1 cc |

EXAMPLE IV

WHITE BREADS

| | Control | Test |
|---|---|---|
| Flour | 600 Grams | 582 Grams |
| Citrus Fiber Additive | — | 18 Grams |
| Water | 370 cc | 390 cc |
| Sugar | 18 Grams | 18 Grams |
| Dextrose | 12 Grams | 12 Grams |
| Honey | 12 Grams | 12 Grams |
| Salt | 12 Grams | 12 Grams |
| Nonfat Dry Milk | 12 Grams | 12 Grams |
| Shortening | 18 Grams | 18 Grams |
| Dry Yeast | 8 Grams | 8 Grams |
| Yeast Nutrient | 0.8 cc | 0.8 cc |

The citrus fiber additive of this invention has other uses than as an additive for breads and cakes as described above. The additive is a good drying agent in the processing of bread dough which normally is so sticky that portions of dough adhere to kneading rollers. As little as 0.25% by weight of the citrus fiber additive based on the weight of flour in the dough overcomes the stickiness difficulties in working the dough.

The additive can also function as an egg extender because of the high protein content of the additive. In recipes where several eggs are required the additive of this invention can replace 15-35% of the requirements of whole egg solids. For example, in a cake recipe where frozen liquid eggs (appx. 25% egg solids and 75% water) are employed, the amount of liquid eggs can be reduced from 100% of the egg solids requirement to 80% and the remaining 20% replaced by a mixture of 5% citrus fiber additive and 15% water. The result is a substantial cost saving with no loss in quality, taste, and texture.

Another use for the citrus fiber additive is as a pie dough conditioner, particularly in the reconditioning of scrap pie dough resulting from trimming the dough extending beyond the edges of the pie pan. This scrap must be treated with water and kneaded to make it ready for sheeting to form a pie crust. This operation causes the dough to become very sticky and difficult to handle. By employing about 0.25-0.5% citrus fiber additive based on the weight of flour in the pie dough, the stickiness can be reduced to the point where the dough is easy to roll into a sheet.

Still another use is in flavoring preparations. Flavor concentrates are usually in the form of oils that must be transformed into some type of dilute emulsion in order to be used in food products. This frequently entails the use of a gum or an emulsifier to get the oil to be dispersed in tiny droplets in water for addition to flour for cake or bread. The citrus fiber additive serves as a carrier for the oil and eliminates the necessity of preparing an emulsion, and in addition, it provides some flavoring of its own to produce a more natural flavor when the basic flavor is to be orange, lemon, or grapefruit. As a carrier for oily flavor concentrates, the citrus fiber additive can absorb up to about 50% of its weight in oil or other liquid flavor concentrate and maintain the character of a dry flour, which is very convenient for use in cake and pastry recipes. Yet another use of the citrus fiber additive is as an additive in sausage or other ground meat. At levels of about 1% by weight of the meat, the additive serves to reduce the loss of water and fat during cooking and thus preserves the flavor and texture of the original product.

Another use for the citrus fiber additive of this invention is as a fibrous filler for paint. Some paint use asbestos filler and other types of fibrous fillers are known. The citrus fiber additive of this invention has been found to be useable in amounts up to as high as 1 part by weight in 3 parts of paint formulation. The paint may be either water-base or oil-base. The paint film produced with a formulation employing 1:3 fiber; paint proportion is a smooth thick, tightly adherent coating.

While the invention has been described with respect to certain specific embodiments, it will be appreciated that many modifications and changes may be made by those skilled in the art without departing from the spirit of the invention. It is intended, therefor, by the appended claims to cover all such modifications and changes as fall within the true spirit and scope of the invention.

What is claimed as new and what it is desired to secure by Letters Patent of the United States is:

1. The process of preparing an edible additive for food from citrus fruit waste comprising the peel, membrane, and pulp of citrus fruits, which process comprises the steps of:
   A. washing the citrus fruit;
   B. removing oil from the whole citrus fruit;
   C. extracting the juice from the citrus fruit, the remaining substance comprising the citrus fruit waste;
   D. chopping the citrus fruit waste into communited chunks;
   E. neutralizing the acid content of the communited chunks of citrus fruit waste to a pH of about 5.5-7.0;
   F. pressing out and removing water and soluble solids from the neutralized chunks of citrus fruit waste;
   G. adding about 1 part of protein flour, containing about 50% protein, per 50 parts of pressed citrus waste;
   H. grinding such mixture until the fruit waste has a small uniform particle size of about 0.25 inch;
   I. drying the mixture to less than about 7% moisture at a mean temperature of less than about 280° F., into a light tan colored material; and
   J. milling said light tan colored material into flour consistency.

2. The process as defined in claim 1 wherein said protein flour is an extracted sesame flour.

3. The process as defined in claim 1 wherein said citrus fruit waste includes seeds.

4. The process as defined in claim 1 wherein said citrus fruit waste is a blend of orange and grapefruit waste.

5. The process as defined in claim 4 wherein said blend is about 80% orange and 20% grapefruit waste, by weight.

6. The process as defined in claim 1 wherein the waste in said drying step is passed through a dryer in a layer having a thickness of about one inch.

7. The process as defined in claim 1 wherein said drying step is carried out in about 210° F. to 230° F. of heat and forced air drying.

8. An edible citrus fiber additive consisting essentially of pressed chunks of fruit waste having a small uniform particle size and 1 part by weight per 50 parts of such fruit waste of a protein flour containing about 50% protein content, the resulting mixture of protein flour and and ground fruit waste being dried to less than about 7% moisture at a mean temperature of less than about 280° F. and having the consistency of milled flour; said pressed chunks of fruit waste comprising peel, membrane, and pulp of citrus fruits which have been washed, the oil removed, and the juice extracted, following which the resulting material has been chopped into small size particles, treated to neutralize the acid content to about 5.5–7.0, and pressed to remove wet molasses.

9. The additive of claim 8 wherein said protein flour is extracted sesame flour.

10. The additive of claim 8 wherein said citrus fruit waste is a blend of orange and grapefruit waste.

11. The additive of claim 10 wherein said blend is about 80% orange and 20% grapefruit waste, by weight.

12. The additive of claim 8 wherein the citrus fruit waste includes citrus fruit seeds.

13. A bread dough composition comprising flour, water and at least 0.25% by weight of the dough of the citrus fiber additive of claim 8.

14. A food composition comprising eggs wherein up to 20% of the egg requirement is replaced by 1 part by weight of the citrus fiber additive of claim 8 per 3 parts by weight of water.

15. A pie dough comprising flour, water and 0.25% to 0.5% by weight of the citrus fiber additive of claim 8.

16. A dry flavoring material comprising 1 part by weight of liquid flavor concentrate and at least 2 parts by weight of the citrus fiber additive of claim 8.

17. A ground meat composition comprising ground meat and about 1% by weight of the meat of the citrus fiber additive of claim 8.

* * * * *